US010715275B2

(12) United States Patent
Nammi et al.

(10) Patent No.: US 10,715,275 B2
(45) Date of Patent: Jul. 14, 2020

(54) CONFIGURING CHANNEL QUALITY INDICATOR FOR COMMUNICATION SERVICE CATEGORIES IN WIRELESS COMMUNICATION SYSTEMS

(71) Applicant: AT&T Intellectual Property I, L.P., Atlanta, GA (US)

(72) Inventors: SaiRamesh Nammi, Austin, TX (US); Arunabha Ghosh, Austin, TX (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 59 days.

(21) Appl. No.: 15/977,461

(22) Filed: May 11, 2018

(65) Prior Publication Data

US 2019/0349119 A1    Nov. 14, 2019

(51) Int. Cl.
*H04L 1/00*     (2006.01)
*H04W 24/10*    (2009.01)

(52) U.S. Cl.
CPC .......... *H04L 1/0026* (2013.01); *H04L 1/0058* (2013.01); *H04W 24/10* (2013.01)

(58) Field of Classification Search
CPC ..... H04L 1/0026; H04L 1/0058; H04W 24/10
USPC ........ 714/746, 750, 821, 704, 712; 455/450; 370/465, 467, 469, 477
See application file for complete search history.

(56) References Cited

U.S. PATENT DOCUMENTS 7,352,722 B2 * 4/2008 Malladi ................ H04L 1/0015
                                                 370/329
8,340,587 B2   12/2012 Gaal et al.
9,178,583 B2   11/2015 Nam et al.
(Continued)

FOREIGN PATENT DOCUMENTS

EP    2134134 A1    1/2012
WO  2010104334 A2   11/2010
(Continued)

OTHER PUBLICATIONS

Ericsson, Offline Discussion on Support of Separate CQI and MCS table(s) for URLLC, Apr. 16-20, 2018, 3GPP TSG RAN WG1, Agenda Item: 7.2.1, pp. 1-6. (Year: 2018).*

(Continued)

*Primary Examiner* — John J Tabone, Jr.
(74) *Attorney, Agent, or Firm* — Amin, Turocy & Watson, LLP

(57) ABSTRACT

The described technology is generally directed towards reporting channel quality information from a wireless user equipment to the network, in a channel state information report that includes channel quality information based on a block error rate threshold value that corresponds to an ultra-reliable low latency communication when the user equipment is in the ultra-reliable low latency communication mode. The channel quality information corresponding to the ultra-reliable low latency communication mode block error rate threshold and the channel quality information corresponding to the enhanced mobile broadband mode block error rate threshold can be included in the same report. Alternatively, the user equipment is instructed to report either the channel quality information for-reliable low latency communication or for enhanced mobile broadband in the channel state information report.

20 Claims, 12 Drawing Sheets

(56) References Cited

U.S. PATENT DOCUMENTS

| | | | |
|---|---|---|---|
| 9,572,060 B2 | 2/2017 | von Elbwart et al. | |
| 9,801,181 B2 | 10/2017 | Huang et al. | |
| 9,967,012 B2 | 5/2018 | Onggosanusi et al. | |
| 10,064,124 B2* | 8/2018 | Lindoff | H04W 48/16 |
| 10,374,679 B2* | 8/2019 | John Wilson | H04B 7/0695 |
| 2007/0147289 A1* | 6/2007 | Nibe | H04L 1/0026 |
| | | | 370/329 |
| 2012/0236817 A1 | 9/2012 | Chen et al. | |
| 2013/0083719 A1 | 4/2013 | Seo et al. | |
| 2014/0185479 A1 | 7/2014 | Lee | |
| 2014/0233503 A1 | 8/2014 | Aiba et al. | |
| 2014/0370904 A1* | 12/2014 | Smith | H04W 8/005 |
| | | | 455/450 |
| 2015/0003275 A1 | 1/2015 | Krishnamurthy | |
| 2015/0092566 A1* | 4/2015 | Balachandran | H04W 8/22 |
| | | | 370/242 |
| 2016/0006495 A1 | 1/2016 | Kim et al. | |
| 2016/0218822 A1* | 7/2016 | Meng | H04L 1/0003 |
| 2016/0302127 A1* | 10/2016 | Moon | H04W 24/10 |
| 2016/0309476 A1* | 10/2016 | Madan | H04W 16/10 |
| 2016/0360475 A1* | 12/2016 | Lindoff | H04W 48/16 |
| 2017/0019162 A1 | 1/2017 | Jeong et al. | |
| 2017/0149548 A1 | 5/2017 | Mouhouche | |
| 2017/0324455 A1 | 11/2017 | Soriaga et al. | |
| 2018/0034612 A1 | 2/2018 | Lin et al. | |
| 2018/0042028 A1 | 2/2018 | Nam et al. | |
| 2018/0048365 A1 | 2/2018 | Yoo et al. | |
| 2018/0103428 A1* | 4/2018 | Jiang | H04W 76/27 |
| 2018/0109302 A1 | 4/2018 | Nagaraja et al. | |
| 2018/0138960 A1 | 5/2018 | Ahn et al. | |
| 2018/0145737 A1 | 5/2018 | Rahman et al. | |
| 2018/0287686 A1* | 10/2018 | John Wilson | H04B 7/0632 |
| 2018/0337764 A1* | 11/2018 | Kwok | H04L 5/0057 |
| 2018/0368133 A1 | 12/2018 | Park et al. | |
| 2019/0036585 A1* | 1/2019 | Hosseini | H04B 7/0639 |
| 2019/0103946 A1* | 4/2019 | Li | H04L 1/1887 |
| 2019/0207667 A1* | 7/2019 | Zhou | H04B 7/0617 |

FOREIGN PATENT DOCUMENTS

| | | | | |
|---|---|---|---|---|
| WO | 2016072784 A1 | 5/2016 | | |
| WO | 2017026860 A1 | 2/2017 | | |
| WO | 2017175937 A1 | 10/2017 | | |
| WO | 2018/018182 A1 | 2/2018 | | |
| WO | 2018028182 A1 | 2/2018 | | |
| WO | 2018034421 A1 | 2/2018 | | |
| WO | 2018044849 A1 | 3/2018 | | |
| WO | 2018052258 A1 | 3/2018 | | |
| WO | WO 2018/044849 | * | 3/2018 | H04L 1/00 |
| WO | 2018058599 A1 | 4/2018 | | |
| WO | 2018058600 A1 | 4/2018 | | |
| WO | 2018062937 A1 | 4/2018 | | |
| WO | 2018064182 A1 | 4/2018 | | |
| WO | 2018091072 A1 | 5/2018 | | |
| WO | 2018097947 A2 | 5/2018 | | |
| WO | WO 2018/091072 | * | 5/2018 | H04L 1/00 |

OTHER PUBLICATIONS

Gerardino, Radio Resource Management for Ultra-Reliable Low-Latency Communications in 5G, 2017, Aalborg University Press, pp. i-xxiv and 1-223. (Year: 2017).*

Samsung et al., WF for Open Issues on CSI Reporting, Sep. 18-21, 2017, 3GPP TSG-RAN WG1 NR-AH3, Agenda: 6.2.2.2, pp. 1-19. (Year: 2017).*

Mahmoud, et al., "Radio Resource Management Techniques for eMBB and mMTC services in 5G Dense Small Cell Scenarios," Published in: 2016 IEEE 84th Vehicular Technology Conference (VTC-Fall), 6 pages.

Pocovi, et al., "Joint Link Adaptation and Scheduling for 5G Ultra-Reliable Low-Latency Communications," vol. 4, 2016, 12 pages.

Notice of Allowance received for U.S. Appl. No. 16/016,091 dated Jul. 11, 2019, 54 pages.

International Search Report and Written Opinion received for PCT Application Serial No. PCT/US2019/030716 dated Aug. 9, 2019, 18 pages.

AT&T, "CQI/MCS Reporting for URLLC", URL: http://www.3gpp.org/ftp/tsg%5Fran/WG1%5FRL1/TSGR1%5F93/Docs, 3GPP TSG RAN WG1 Meeting #93, R1-1806977, May 21-25, 2018, pp. 1-6.

MediaTek Inc., "CQI reporting for multiple services in NR", URL: http://www.3gpp.org/ftpjtsg%5Fran/WG1%5FRL1/TSGR1%5FAH/NR%5FAH%5F1801/Docs/, 3GPP TSG RAN WG1 Meeting AH-1801, R1-1800169, Jan. 22-26, 2018, 6 pages.

Huawei et al., "PDSCH design for URLLC", URL: http://www.3gpp.org/ftp/Meetings%5F3GPP%5FSYNC/RAN1/Docs, 3GPP TSG RAN WG1 Meeting #93, R1-1805900, May 21-25, 2018, 9 pages.

"Physical layer procedures for data", URL: http://www.3gpp.orgjftp/tsg%5Fran/WG1%5FRL1/TSGR1%5FAH/NR%5FAH%5F1801/Docs, 3GPP TS 38.214, 3rd Generation Partnership Project, Technical Specification Group Radio Access Network, NR, Release 15, Feb. 2018, pp. 1-73.

* cited by examiner

CONFIGURING CHANNEL QUALITY INDICATOR FOR COMMUNICATION SERVICE CATEGORIES IN WIRELESS COMMUNICATION SYSTEMS

TECHNICAL FIELD

The subject application is related to wireless communication systems, and, for example, to configuring channel quality indicator for ultra-reliable low latency communication and/or enhanced mobile broadband communication services in a wireless communication system.

BACKGROUND

In wireless communication systems, including New Radio (NR, sometimes referred to as 5G) and likely beyond, user equipment computes channel estimates based on pilot or reference signals, and computes the parameters needed for channel state information (CSI) reporting. A CSI report is sent from the user equipment to a network device via a feedback channel on request from the network (aperiodically), or the user equipment may be configured to send the CSI report periodically. A network scheduler uses this information in choosing the parameters for scheduling of this particular user equipment. The network sends the scheduling parameters to the user equipment in a downlink control channel. After that, actual data transfer takes place from the network to the user equipment.

The time and frequency resources that can be used by the user equipment to report CSI are controlled by the network, which sends reporting configuration settings to the user equipment for configuring the report. For example, the user equipment determines the channel quality indicator (CQI), which indicates the highest modulation and code rate at which the block error rate (BLER) of the channel being analyzed will not exceed a CQI threshold, which is $10^{-1}$ for the enhanced mobile broadband (eMbb) service category. This CQI threshold for eMbb is not appropriate for more reliable communications.

BRIEF DESCRIPTION OF THE DRAWINGS

The technology described herein is illustrated by way of example and not limited in the accompanying figures in which like reference numerals indicate similar elements and in which.

DETAILED DESCRIPTION

Briefly, one or more aspects of the technology described herein are generally directed towards having a user equipment to report channel quality information, in a channel state information report, that includes channel quality information based on a block error rate threshold value that corresponds to an ultra-reliable low latency communication when the user equipment is in the ultra-reliable low latency communication mode. In one or more implementations, the ultra-reliable low latency communication block error rate threshold value is $10^{-5}$, in contrast to the $10^{-1}$ block error rate threshold for enhanced mobile broadband communication. Note that two different thresholds are used rather than using the high-reliability $10^{-5}$ threshold because when only conventional reliability is needed, the spectral efficiency is greater than the spectral efficiency with high reliability.

In one or more implementations, the channel state information report includes channel quality information corresponding to the ultra-reliable low latency communication mode block error rate threshold and the channel quality information corresponding to the enhanced mobile broadband mode block error rate threshold. This allows the network to schedule the user equipment according to whichever mode is in use, and switch the scheduling any time the mode changes from the ultra-reliable low latency communication mode to the enhanced mobile broadband mode, or vice-versa.

In one or more alternative implementations, the user equipment is instructed to report the channel quality information in the channel state information report according to a block error rate threshold configuration setting (a parameter value) provided by the network. In other words, the network configures the user equipment with channel state information report settings, including a block error rate threshold setting. Thus, along with the resources for channel state information reporting, the network sends a parameter with a value indicating which block error rate threshold is desired for computing the channel quality information, e.g., the ultra-reliable low latency communication mode block error rate threshold or the enhanced mobile broadband mode block error rate threshold. This can be changed by the network, by requesting a new report.

It should be understood that any of the examples and terms used herein are non-limiting. For instance, some examples are based on New Radio (NR, sometimes referred to as 5G) communications between a user equipment exemplified as a smartphone or the like and network device; however virtually any communications devices may benefit from the technology described herein, and/or their use in different spectrums may likewise benefit. Thus, any of the embodiments, aspects, concepts, structures, functionalities or examples described herein are non-limiting, and the technology may be used in various ways that provide benefits and advantages in radio communications in general.

Figure 1:
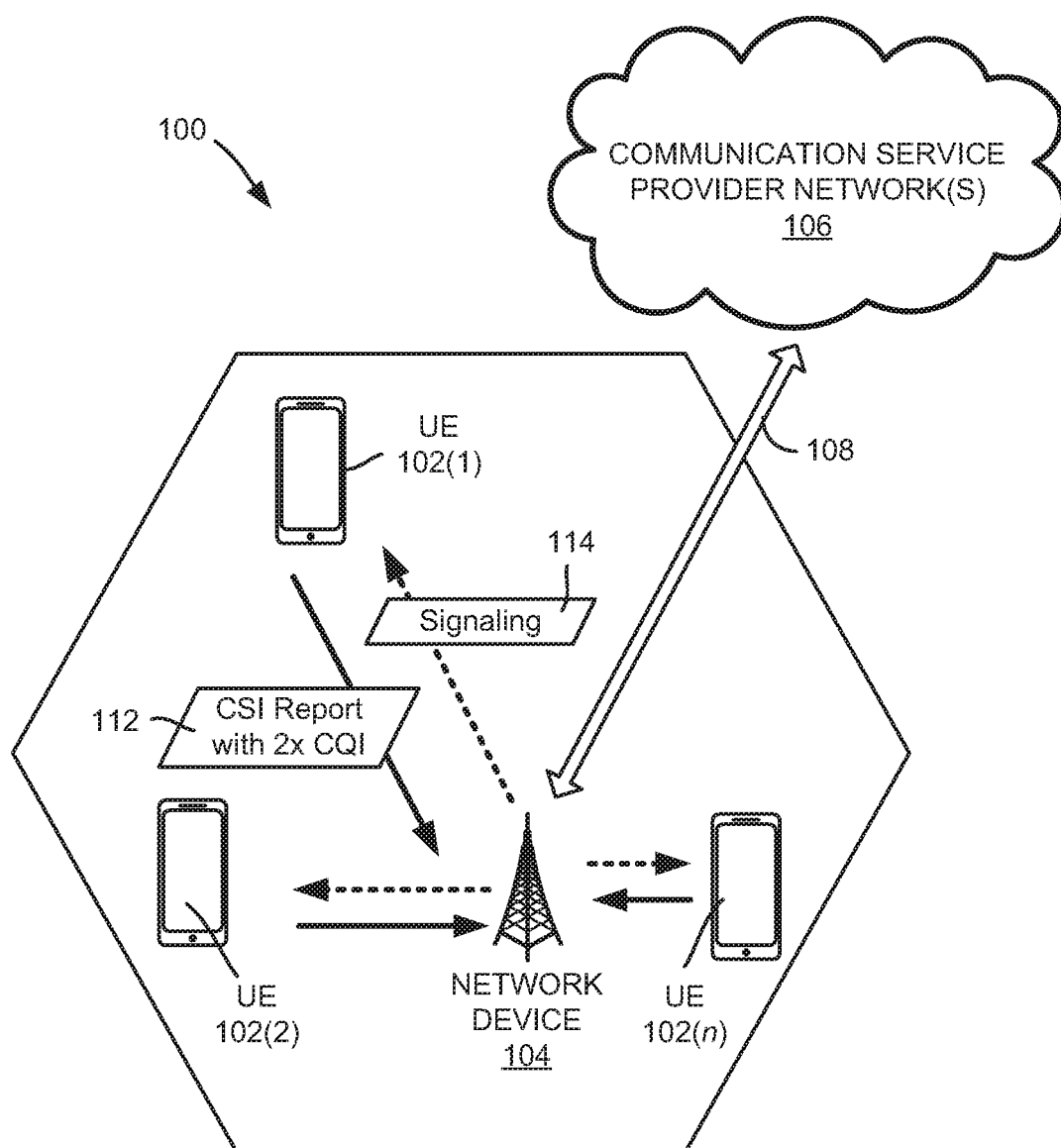
FIG. 1 illustrates an example wireless communication system in which a network node device (e.g., network node) and user equipment (UE) can use dual-channel quality indicator (CQI) threshold reporting to implement various aspects and implementations of the subject disclosure.

FIG. 1 illustrates an example wireless communication system 100 in accordance with various aspects and embodiments of the subject technology. In one or more embodiments, the system 100 can comprise one or more user equipment, e.g., UEs 102(1)-102(n).

In various embodiments, the system 100 is or comprises a wireless communication network serviced by one or more wireless communication network providers. In example embodiments, a UE 102 can be communicatively coupled to the wireless communication network via a network device 104 (e.g., network node). The network device 104 can communicate with the user equipment (UE), thus providing connectivity between the UE and the wider cellular network.

In example implementations, each UE such as the UE 102(1) is able to send and/or receive communication data via a wireless link to the network device 104. The dashed arrow lines from the network device 104 to the UE 102 represent downlink (DL) communications and the solid arrow lines from the UE 102 to the network device 104 represents uplink (UL) communications.

The system 100 can further include one or more communication service provider networks 106 that facilitate providing wireless communication services to various UEs, including UES 102(1)-102(n), via the network device 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.).

The network device 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

The wireless communication system 100 can employ various cellular systems, technologies, and modulation schemes to facilitate wireless radio communications between devices (e.g., a UE 102 and the network device 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 100 can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

In FIG. 1, as described herein, a user equipment (e.g., 102(1)) is configured by the network device to provide the network device 104 with a channel state information report 112 that the network device uses in scheduling the user equipment 102(1). Unlike conventional reporting, the network device 104 can request (via signaling 114) a dual-mode channel quality indicator that includes channel quality indicator data based on both the ultra-reliable low latency communication and channel quality indicator based on the enhanced mobile broadband block error rate threshold. Otherwise, the network device 104 can request the channel state information report with channel quality indicator data based only on the enhanced mobile broadband block error rate threshold.

To this end, the network device 104 can perform radio resource control (RRC)/higher layer signaling, e.g., in which one bit can be used indicate to the user equipment whether it is in the ultra-reliable low latency communication mode or enhanced mobile broadband mode, and thereby which CQI format to use. Alternatively, the network device 104 can perform dynamic signaling layer indicator L1/L2, in which when the network requests an aperiodic channel state information report, the network device 104 indicates which table format to use to report the channel quality indicator data. Note that the network device 104 can use both (RRC)/higher layer signaling and dynamic signaling.

The following table, TABLE 1 shows how channel quality indicator data based on both the ultra-reliable low latency communication and channel quality indicator data based on the enhanced mobile broadband block error rate threshold can be reported in the same report:

TABLE 1

Contents of CSI report for dual-service channel quality indicator data based on both thresholds, $10^{-1}$ and $10^{-5}$, reporting both wideband and subband for each:

| PMI-FormatIndicator = widebandPMI and CQI-FormatIndicator = widebandCQI | | PMI-FormatIndicator = subbandPMI or CQI-FormatIndicator = subbandCQI | |
|---|---|---|---|
| | CSI Part I | CSI Part II | |
| | | wideband | Subband |
| CRI | CRI | Wideband CQI (corresponding to CQI threshold of $10^{\wedge}(-5)$) | Subband differential CQI (corresponding to CQI threshold of $10^{\wedge}(-5)$) |
| Rank Indicator | Rank Indicator | PMI wideband (X1 and X2) | PMI subband information fields $X_2$ of all even subbands |
| Layer Indicator | Layer Indicator | — | Subband differential CQI (corresponding to CQI threshold of $10^{\wedge}(-5)$) |
| PMI wideband (X1 and X2) | Wideband CQI (corresponding to CQI threshold of $10^{\wedge}(-1)$) | — | PMI subband information fields $X_2$ of all odd subbands |
| Wideband CQI | Subband differential CQI | — | — |

TABLE 1-continued

Contents of CSI report for dual-service channel quality indicator data based on both thresholds, $10^{-1}$ and $10^{-5}$, reporting both wideband and subband for each:

| | | PMI-FormatIndicator = subbandPMI or CQI-FormatIndicator = subbandCQI | |
|---|---|---|---|
| PMI-FormatIndicator = widebandPMI and | | CSI Part II | |
| CQI-FormatIndicator = widebandCQI | CSI Part I | wideband | Subband |
| | (corresponding to CQI threshold of $10^{\wedge}(-1)$) | | |

The following table, TABLE 2 shows how channel quality indicator based on the enhanced mobile broadband block error rate threshold can be reported:

TABLE 2

Contents of CSI report for eMbb reporting wideband and side band

| | | PMI-FormatIndicator = subbandPMI or CQI-FormatIndicator = subbandCQI | |
|---|---|---|---|
| PMI-FormatIndicator = widebandPMI and | | CSI Part II | |
| CQI-FormatIndicator = widebandCQI | CSI Part I | wideband | Sideband |
| CRI | CRI | Wideband CQI for the second TB | Subband differential CQI for the second TB of all even subbands |
| Rank Indicator | Rank Indicator | PMI wideband (X1 and X2) | PMI subband information fields $X_2$ of all even subbands |
| Layer Indicator | Layer Indicator | — | Subband differential CQI for the second TB of all odd subbands |
| PMI wideband (X1 and X2) | Wideband CQI | — | PMI subband information fields $X_2$ of all odd subbands |
| Wideband CQI | Subband differential CQI for the first TB | — | — |

As can be seen, the wideband and sideband table entries for the second transmit block in TABLE 2 are replaced by the channel quality indicator data (wideband and sideband) based on the $10^{-5}$ threshold in the dual-service report of TABLE 1. This is possible because with New Radio-reliable low latency communication, the maximum rank is four, hence a single codeword is sufficient.

Figure 2:
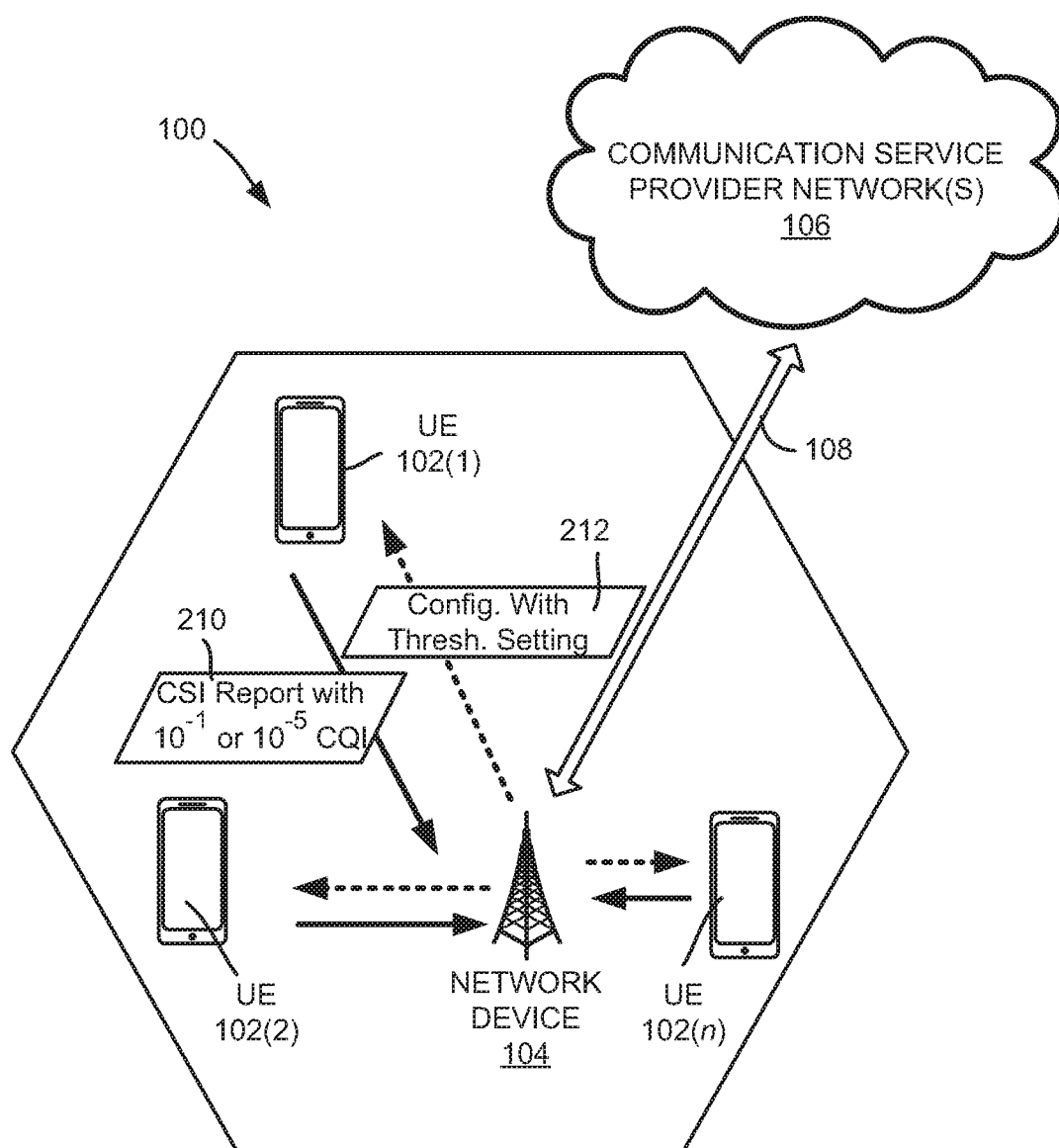
FIG. 2 illustrates an example wireless communication system in which a network node device (e.g., network node) and user equipment (UE) can switch between single, different CQI threshold reporting to implement various aspects and implementations of the subject disclosure.

FIG. 2 exemplifies an alternative embodiment, in which a single service channel state information report is used for either channel quality indicator data based on both the ultra-reliable low latency communication or channel quality indicator data based on the enhanced mobile broadband block error rate threshold can be reported in the same report, (but not both in the same report/at the same time). To this end, the network device 104 configures the channel state information report 210 of a user equipment 102(1) based on channel state information report configuration settings 212.

In general, in this alternative embodiment, the network configures the user equipment with channel state information report settings, where the network indicates the block error rate threshold and the resources for channel state information reporting. Hence, as an example, the network configures the channel state information report setting I with threshold of $10^{-1}$ and the PUCCH (physical uplink control channel) resources, then the user equipment reports the channel quality indicator corresponds to the threshold of $10^{-1}$ on the resources allocated by the network. Similarly, consider that the network configures the channel state information report setting II with threshold of $10^{-5}$ and the PUCCH resources; then the user equipment reports the channel quality indicator corresponds to the threshold of $10^{-5}$ on the resources allocated by the network. Hence with this method the network can reuse the existing single channel state information reporting structure, however the block error rate threshold is indicated in the channel state information report setting.

More particularly, the time and frequency resources that can be used by the user equipment to report channel state information are controlled by the network device 104. The channel state information may comprise the channel quality indicator (CQI), preceding matrix indicator (PMI), CSI-RS resource indicator (CRI), SS/PBCH Block Resource indicator (SSBRI), layer indicator (LI), rank indicator (RI) and/or L1-RSRP (Reference Signal Received Power).

For CQI, PMI, CRI, SSBRI, LI, RI, L1-RSRP, the user equipment 102(1) is configured by higher layers with N≥1 CSI-ReportConfig reporting settings, M≥1 CSI-ResourceConfig resource settings, and one or two list(s) of trigger states (given by the higher layer parameters aperiodicTriggerStateList and semiPersistentOnPUSCH-TriggerStateList, (where PUSCH stands for physical uplink shared channel). Each trigger state in aperiodicTriggerStateList contains a list of associated CSI-ReportConfigs indicating the Resource Set IDs for channel and optionally for interference. Each trigger state in semiPersistentOnPUSCH-TriggerStateList contains one associated CSI-ReportConfig.

With respect to the reporting settings, in one or more implementations, each reporting setting in CSI-ReportConfig is associated with a single downlink bandwidth part (BWP) (indicated by higher layer parameter bwp-Id) given in the associated CSI-ResourceConfig for channel measurement) and contains the parameter(s) for one CSI reporting band: codebook configuration including codebook subset restriction, time-domain behavior, frequency granularity for CQI and PMI, measurement restriction configurations, block error rate (BLER) threshold for CQI (e.g., to choose the $10^{-1}$ or $10^{-5}$ threshold) and the CSI-related quantities to be reported by the UE such as the layer indicator (LI), L1-RSRP, CRI, and SSBRI (SSB Resource Indicator).

Thus, as can be seen, the channel state information report configuration settings 212 contain the configuration settings for the block error rate (BLER) threshold for the channel quality indicator. That is, the settings include a parameter value by which the user equipment knows on which block error rate (e.g., $10^{-1}$ or $10^{-5}$) threshold to base the channel quality indicator that is reported.

Note that is it feasible for a network to use embodiment(s) for dual-service CSI reporting (both low and high threshold-based CSIs in one report), and the alternative embodiment(s) that switch configure report configuration settings so that one or the other (low or high threshold-based CSI) is put into the report. While it is likely that only one alternative or the other alternative will be practiced, there may be situations in which, for example, one is more efficient for one type of user equipment/usage scenario (e.g., one that changes modes often) and the other for a different type of user equipment/ usage scenario (e.g., one that rarely changes modes).

Figure 3:
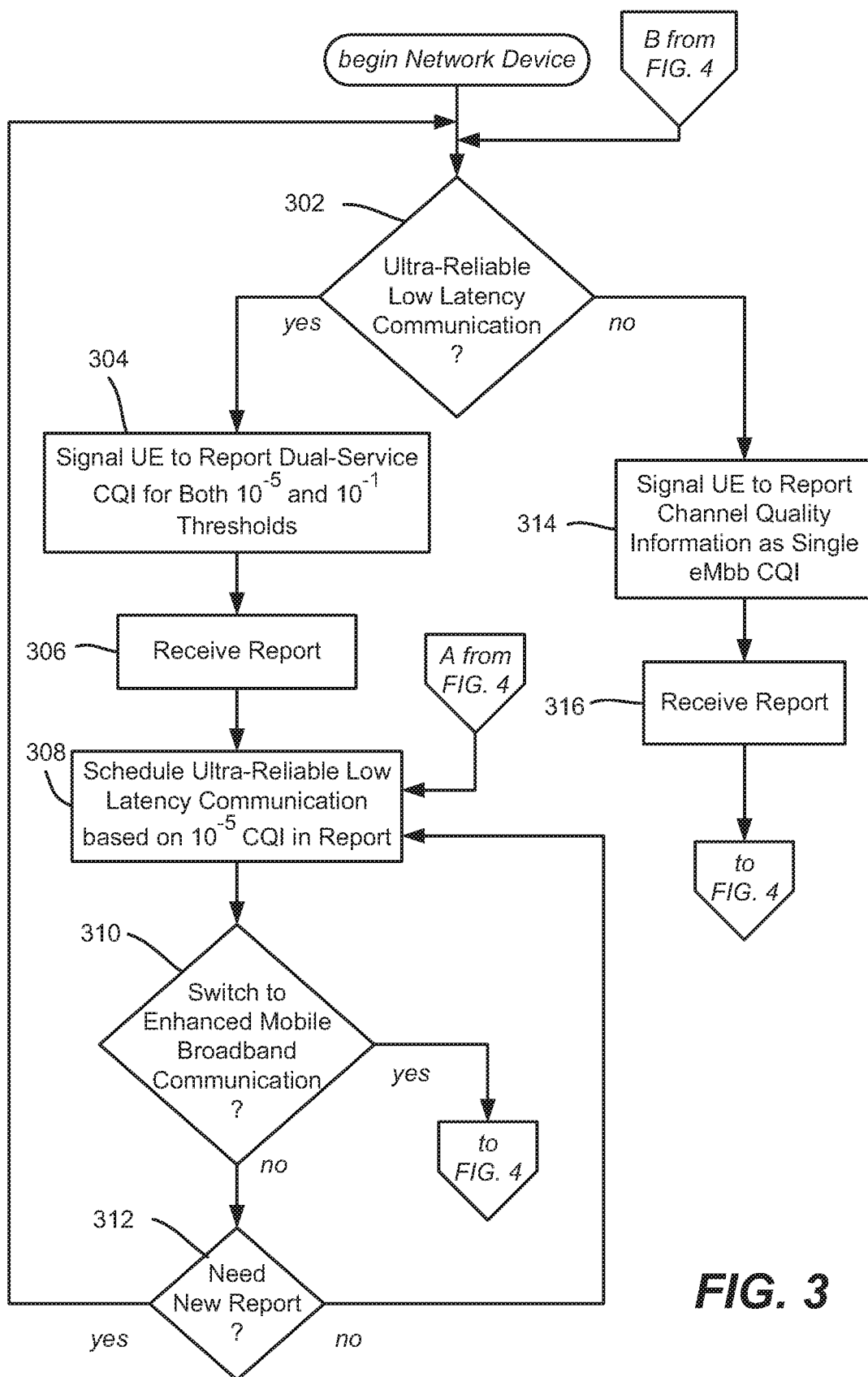
FIGS. 3 and 4 comprise an example flow diagram of network node operations for processing a channel state information (CSI) report with dual-CQI information based on a communication service in use, in accordance with various aspects and implementations of the subject disclosure.
Figure 4:
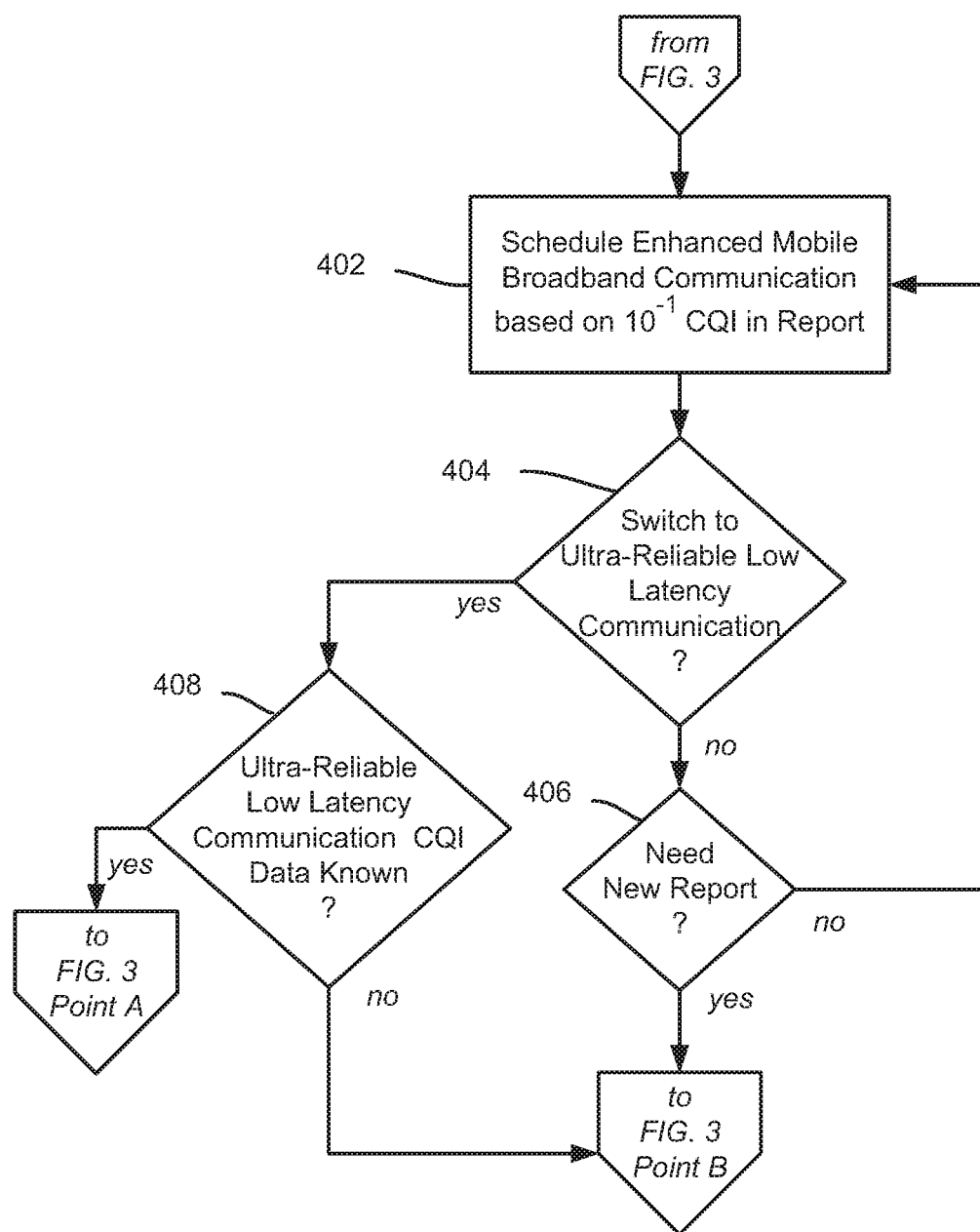

FIGS. 3 and 4 summarize various example operations of a network device in which a dual-service channel quality indicator for both the ultra-reliable low latency communication and enhanced mobile broadband thresholds are sent in the same channel state information report. Operation 302 represents determining whether ultra-reliable low latency communication is in use. If so, operation 304 signals the user equipment to use the TABLE 1 format to report both ultra-reliable low latency communication-based channel state information and enhanced mobile broadband-based channel state information in the same report.

Operation 306 represents receiving the report, which operation 308 uses to schedule the user equipment, which in this example is currently to schedule for communication in the ultra-reliable low latency communication mode. The scheduling continues as needed until the network node decides to switch to the enhanced mobile broadband mode (operation 310) or a new report is needed (operation 312).

Returning to operation 302, if the scheduling is for the enhanced mobile broadband mode, operation 314 instead signals for the user equipment to report the channel quality indicator based on the enhanced mobile broadband threshold only, that is, use TABLE 2 above. Operation 316 represents receiving the report.

FIG. 4 represents operating with respect to the enhanced mobile broadband, beginning at operation 402 which schedules the user equipment accordingly. The scheduling continues as needed until the network node decides to switch to the ultra-reliable low latency communication mode (operation 404) or a new report is needed (operation 406).

It should be noted that when switching from the ultra-reliable low latency communication mode to the enhanced mobile broadband mode, a new channel state information report may not be needed, at least not initially, because the channel quality indicator data for the enhanced mobile broadband is already present in the same report. Thus, in the example of FIG. 3, operation 310 can branch to operation 402 of FIG. 4 without requesting a new channel state information report.

Similarly, in this example, operation 404 branches to operation 408 when switching to the ultra-reliable low latency communication mode; if the channel quality indicator data is already known (because the dual service channel state information report is the latest report), then operation 408 can branch to operation 308, without needing a new channel state information report. Notwithstanding, if is feasible to have a system where such a mode switch corresponds to a request a new report.

Figure 5:
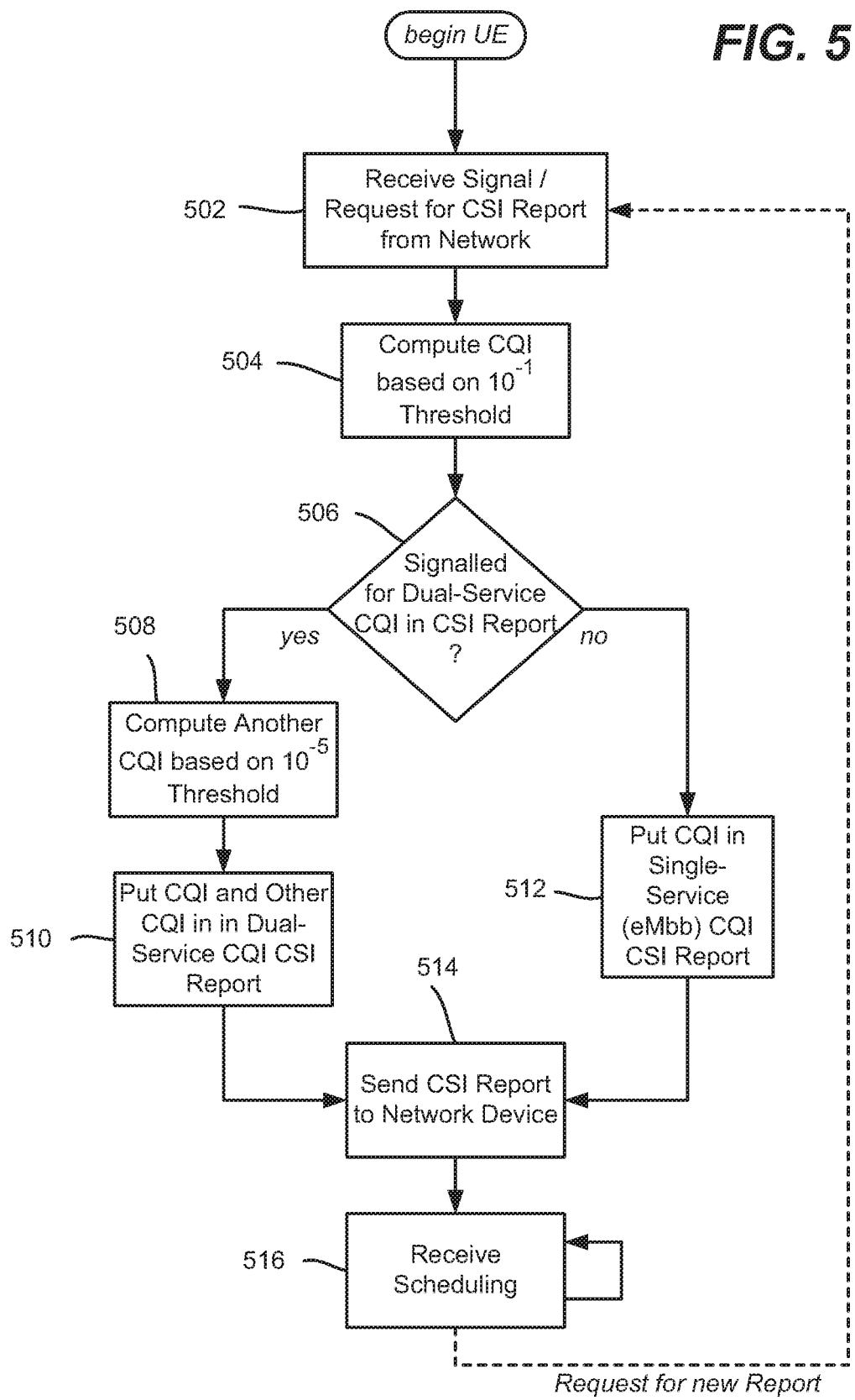
FIG. 5 illustrates an example flow diagram of user equipment operations for providing a CSI report with dual-CQI information, in accordance with various aspects and implementations of the subject disclosure.

FIG. 5 represents example operations of the user equipment in which a dual-service channel quality indicator for both the ultra-reliable low latency communication and enhanced mobile broadband thresholds are sent in the same channel state information report. Thus, the user equipment operations of FIG. 5 can work with the network device operations of FIGS. 3 and 4.

Operation 502 represents receiving the signaling/request for a channel state information report from the network device. Operation 504 represents computing the channel quality indicator based on the enhanced mobile broadband (e.g., $10^{-1}$) block error rate threshold Operation 506 represents evaluating whether the user equipment was signaled by the network for the dual-service (both) channel quality indicators in the channel state information report. If so, operation 508 computes another channel quality indicator based on the ultra-reliable low latency communication (e.g., $10^{-5}$) block error rate threshold, and operation 510 puts the channel quality indicator (for enhanced mobile broadband) and the other channel quality indicator (for ultra-reliable low latency communication) in the dual-service channel quality indicator channel state information report, e.g., in the TABLE 1 format.

If instead signaled for the single (enhanced mobile broadband) service channel state information report, operation 506 branches to operation 512, which puts the channel quality indicator in the single-service (enhanced mobile broadband) channel quality indicator channel state information report, e.g., in the TABLE 2 format.

Once the channel state information report is ready, operation 514 sends the channel state information report to the network device; (note that other data put into the report is not described in FIG. 5). Operation 516 represents receiving scheduling parameters as needed by the user equipment, which continues as needed until a request for a new report is received, or the process otherwise terminates (e.g., the user equipment shuts off).

Figure 6:
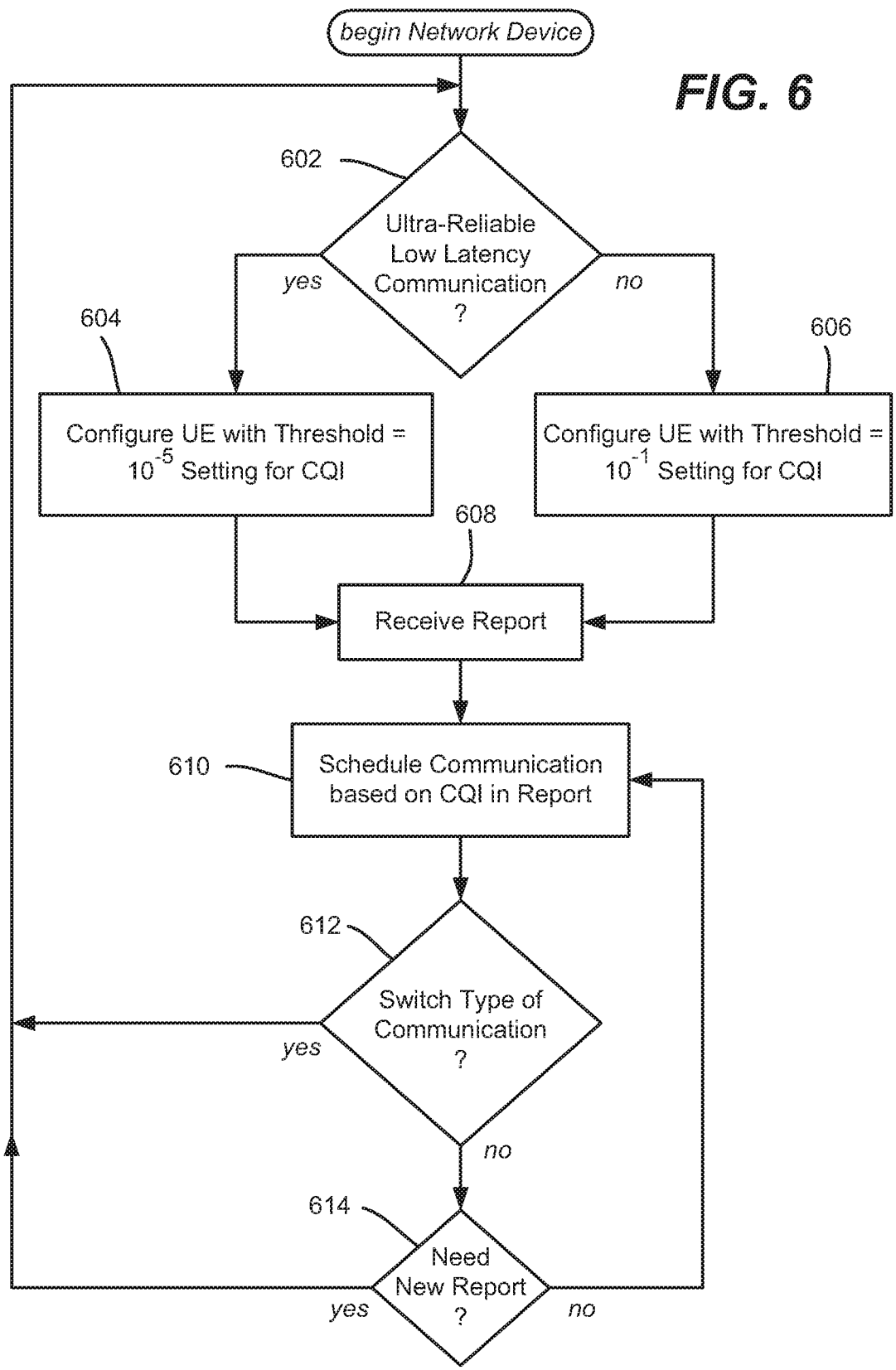
FIG. 6 illustrates an example flow diagram of network node operations for requesting, obtaining and processing a CSI report that contains CQI information based on a communication service in use, in accordance with various aspects and implementations of the subject disclosure, in accordance with various aspects and implementations of the subject disclosure.

FIG. 6 summarizes various example operations of a network device in which a single-service channel quality indicator, based on either the ultra-reliable low latency communication threshold or the enhanced mobile broadband threshold, (but not both), is are sent in the same channel state information report. Operation 602 represents determining whether ultra-reliable low latency communication is in use. If so, operation 604 configures the user equipment with the setting to use the ultra-reliable low latency communication block error rate threshold (e.g., $10^{-5}$) for the channel quality indicator. If not, operation 606 configures the user equipment with the setting to use the enhanced mobile broadband block error rate threshold (e.g., $\mathbf{10^{-1}}$) for the channel quality indicator.

Operation 608 represents receiving the channel state information report, and operation 610 represents scheduling the user equipment, including based on the channel quality indicator data for ultra-reliable low latency communication or enhanced mobile broadband in the channel state information report. The scheduling continues as needed, until/unless the communication mode switches as detected by operation 612 (corresponding to needing a new report) or a new report is otherwise needed (operation 614).

Figure 7:
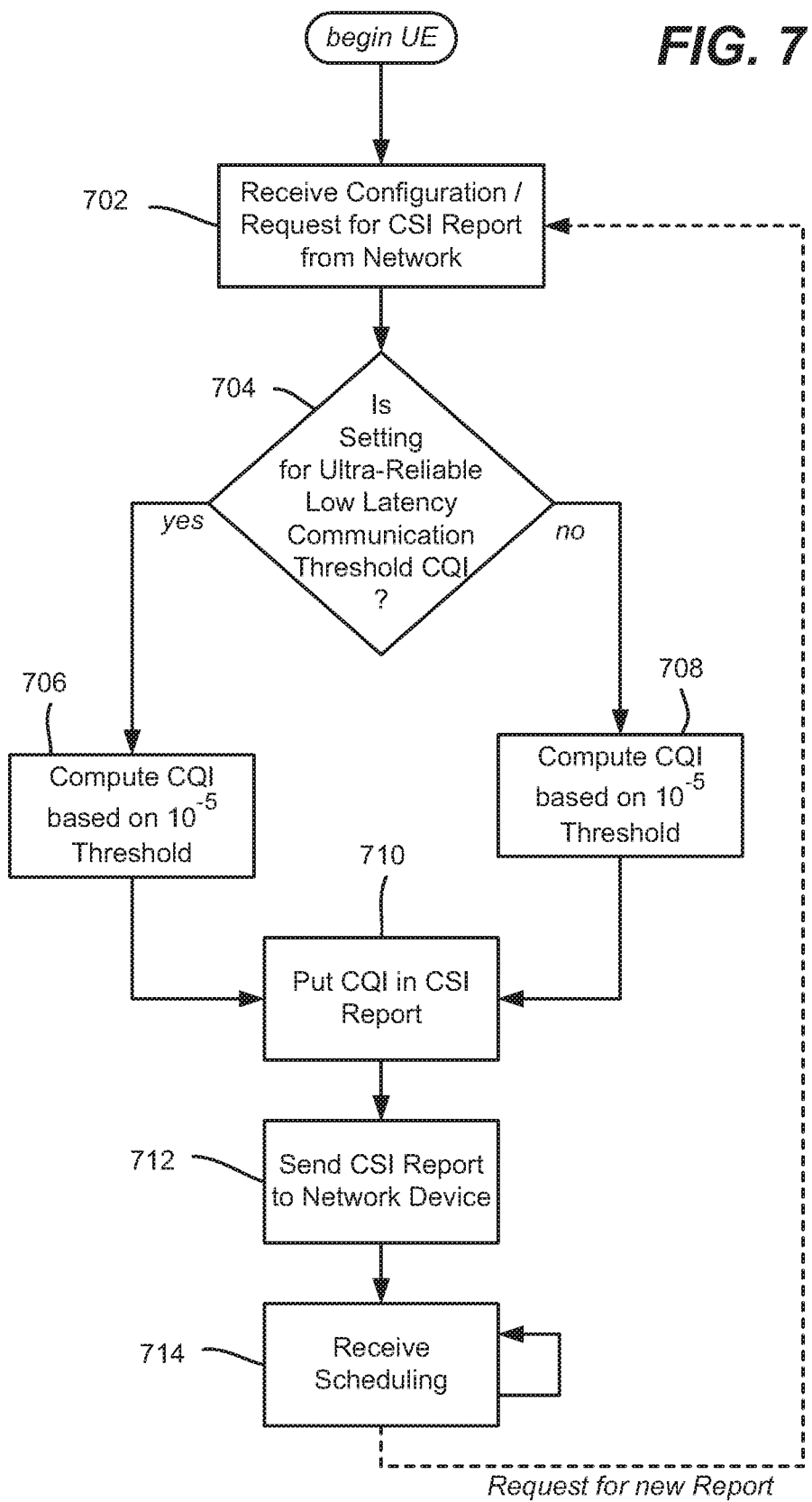
FIG. 7 illustrates an example flow diagram of user equipment operations for providing a CSI report with CQI information for a particular service category, in accordance with various aspects and implementations of the subject disclosure.

FIG. 7 represents example operations of the user equipment in which a single-service channel quality indicator based on either the ultra-reliable low latency communication threshold or the enhanced mobile broadband threshold is sent in the same channel state information report. Thus, the user equipment operations of FIG. 7 can work with the network device operations of FIG. 6.

Operation 702 represents receiving the configuration settings/request for a channel state information report from the network device. Operation 704 represents evaluating the settings to determine whether the setting indicates that the channel quality indicator should be based on the ultra-reliable low latency communication threshold value ($10^{-s}$) or the enhanced mobile broadband threshold value ($10^{-1}$). If ultra-reliable low latency communication, operation 706 computes the channel quality indicator based on the ultra-reliable low latency communication (e.g., $10^{-5}$) block error rate threshold. If enhanced mobile broadband, operation 708 represents computing the channel quality indicator based on the enhanced mobile broadband (e.g., $10^{-1}$) block error rate threshold.

Once the channel state information report is ready, operation 712 sends the channel state information report to the network device; (note that other data put into the report is not described in FIG. 7). Operation 714 represents receiving scheduling parameters as needed by the user equipment, which continues as needed until a request for a new report is received, or the process otherwise terminates (e.g., the user equipment shuts off).

Figure 8:
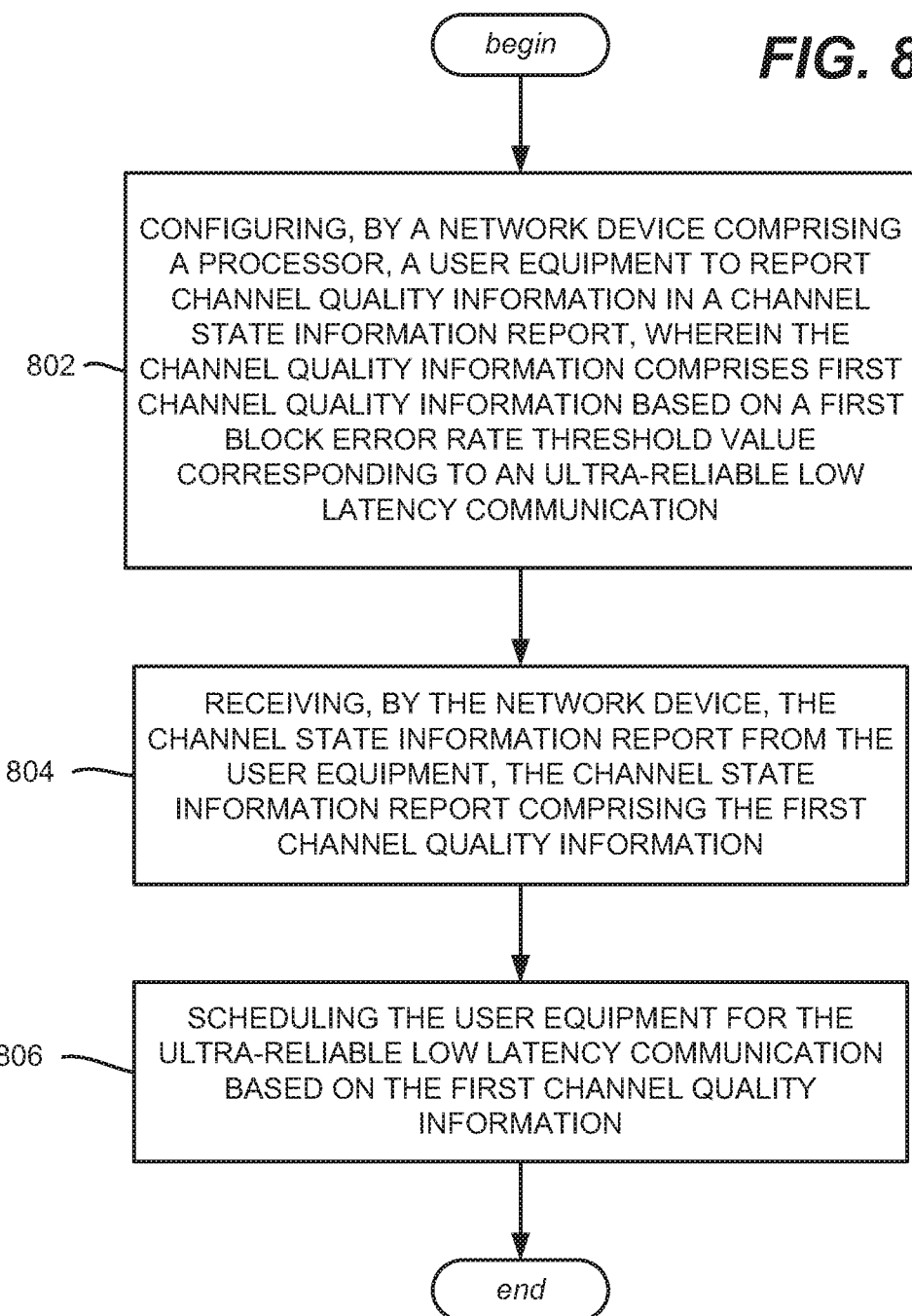
FIG. 8 illustrates an example flow diagram of aspects of network device operations, in accordance with various aspects and implementations of the subject disclosure.

One or more aspects, generally represented in FIG. 8, represent example operations comprising configuring, by a network device comprising a processor, a user equipment to report channel quality information in a channel state information report, wherein the channel quality information comprises first channel quality information based on a first block error rate threshold value corresponding to an ultra-reliable low latency communication (operation 802) Operation 804 represents receiving, by the network device, the channel state information report from the user equipment, the channel state information report comprising the first channel quality information. Operation 806 represents scheduling the user equipment for the ultra-reliable low latency communication based on the first channel quality information Configuring the user equipment can comprise setting the user equipment to report the first channel quality information via a channel state information report setting parameter with a first value. The channel state information report can be a first channel state information report, and aspects can comprise reconfiguring, by the network device, the user equipment to report second channel quality information via the channel state information report setting parameter with a second value, wherein the channel quality information can comprise second channel quality information based on a second error rate threshold value corresponding to enhanced mobile broadband communication, receiving, by the network device, a second channel state information report from the user equipment, the second channel state information report comprising the second channel quality information, and scheduling the user equipment for enhanced mobile broadband communication based on the second channel quality information.

Receiving the channel state information report from the user equipment further can comprise receiving second channel quality information based on a second block error rate threshold value corresponding to enhanced mobile broadband communication.

Aspects can comprise scheduling the user equipment for enhanced mobile broadband communication based on the second channel quality information.

Receiving the channel state information report can comprise receiving the first channel quality information as wideband channel quality information in part II of the channel state information report and subband channel quality information in the part II of the channel state information report. Receiving the channel state information report can comprise receiving the second channel quality information as wideband second channel quality information in a first codeword of part I of the channel state information report and subband second channel quality information in a second codeword of part I of the channel state information report.

Figure 9:
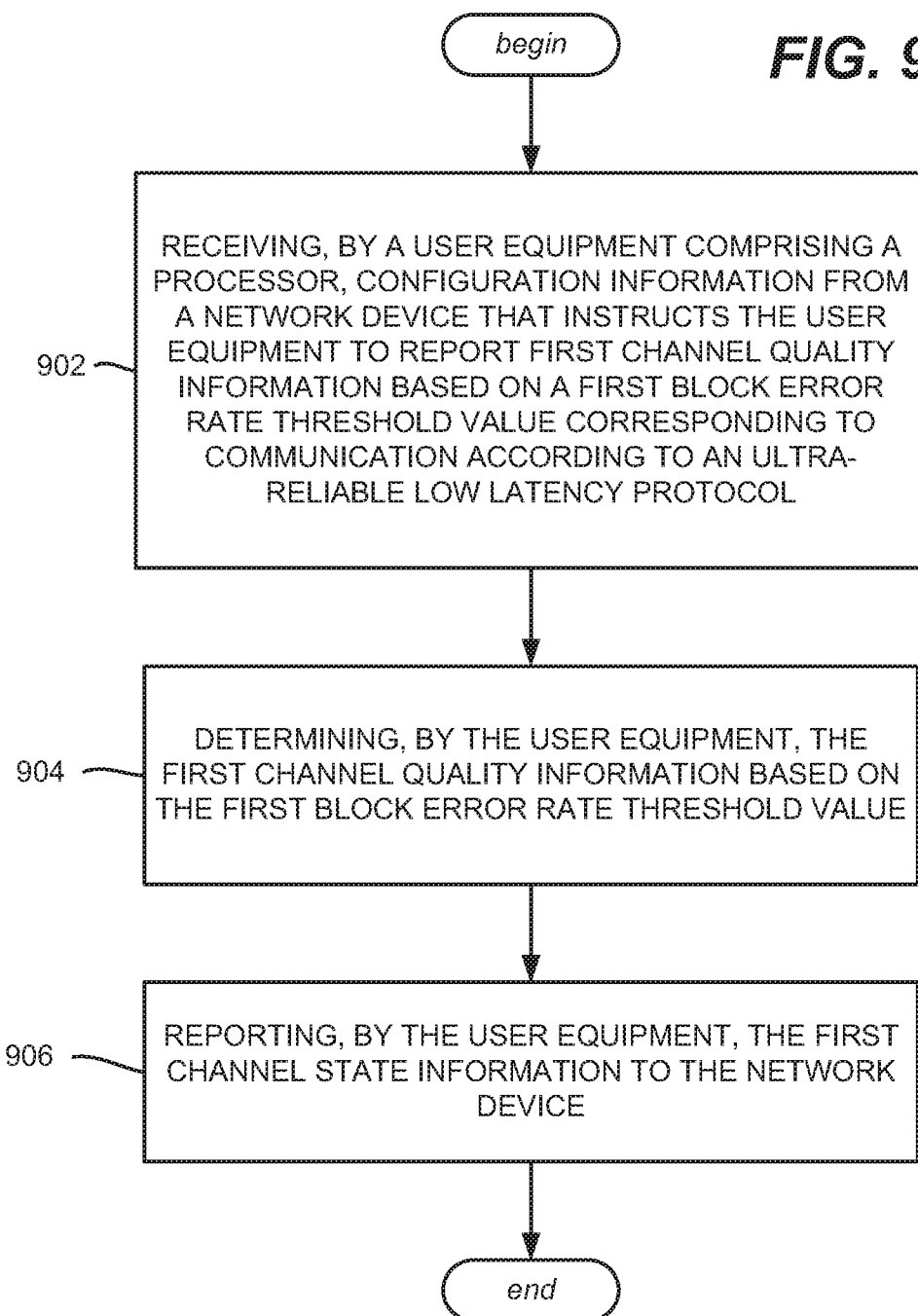
FIG. 9 illustrates an example flow diagram of aspects of user equipment operations, in accordance with various aspects and implementations of the subject disclosure.

FIG. 9 represents example operations of a user equipment comprising a processor, including operation 902 which represents receiving configuration information from a network device that instructs the user equipment to report first channel quality information based on a first block error rate threshold value corresponding to communication according to an ultra-reliable low latency protocol. Operation 904 represents determining, by the user equipment, the first channel quality information based on the first block error rate threshold value. Operation 906 represents reporting, by the user equipment, the first channel state information to the network device.

Determining the first channel quality information based on the first block error rate threshold value can comprise determining the first channel quality information based on the block error rate threshold value being equal to 10-5 or about 10-5. Receiving the configuration information from the network device can comprise receiving a channel state information report setting parameter with a first value.

Aspects can comprise receiving, by the user equipment, the channel state information report setting parameter with a second value, and in response, determining, by the user equipment, second channel quality information based on a second block error rate threshold value corresponding to communication according to an enhanced mobile broadband protocol, and reporting, by the user equipment, the second channel state information to the network device.

Receiving the configuration information from the network device can comprise receiving a channel state information report setting parameter with a first value, and can comprise communicating, by the user equipment, according to the ultra-reliable low latency protocol with the network device, receiving, by the user equipment, the channel state information report setting parameter with a second value, and in response, determining, by the user equipment, second channel quality information based on a second block error rate threshold value corresponding to communication according to an enhanced mobile broadband protocol, reporting, by the user equipment, the second channel state information to the network device, and communicating, by the user equipment, with the network device according to the enhanced mobile broadband protocol.

Reporting further can comprise reporting second channel quality information based on a second block error rate threshold value corresponding to enhanced mobile broadband communication in a same report with the first channel state information. Reporting can comprise reporting the first channel quality information as wideband channel quality information in part II of a channel state information report and subband channel quality information in part II of the channel state information report, and reporting the second channel quality information as wideband channel quality information in a codeword of part I of the channel state information report and subband channel quality information in a different codeword of part I of the channel state information report.

Figure 10:
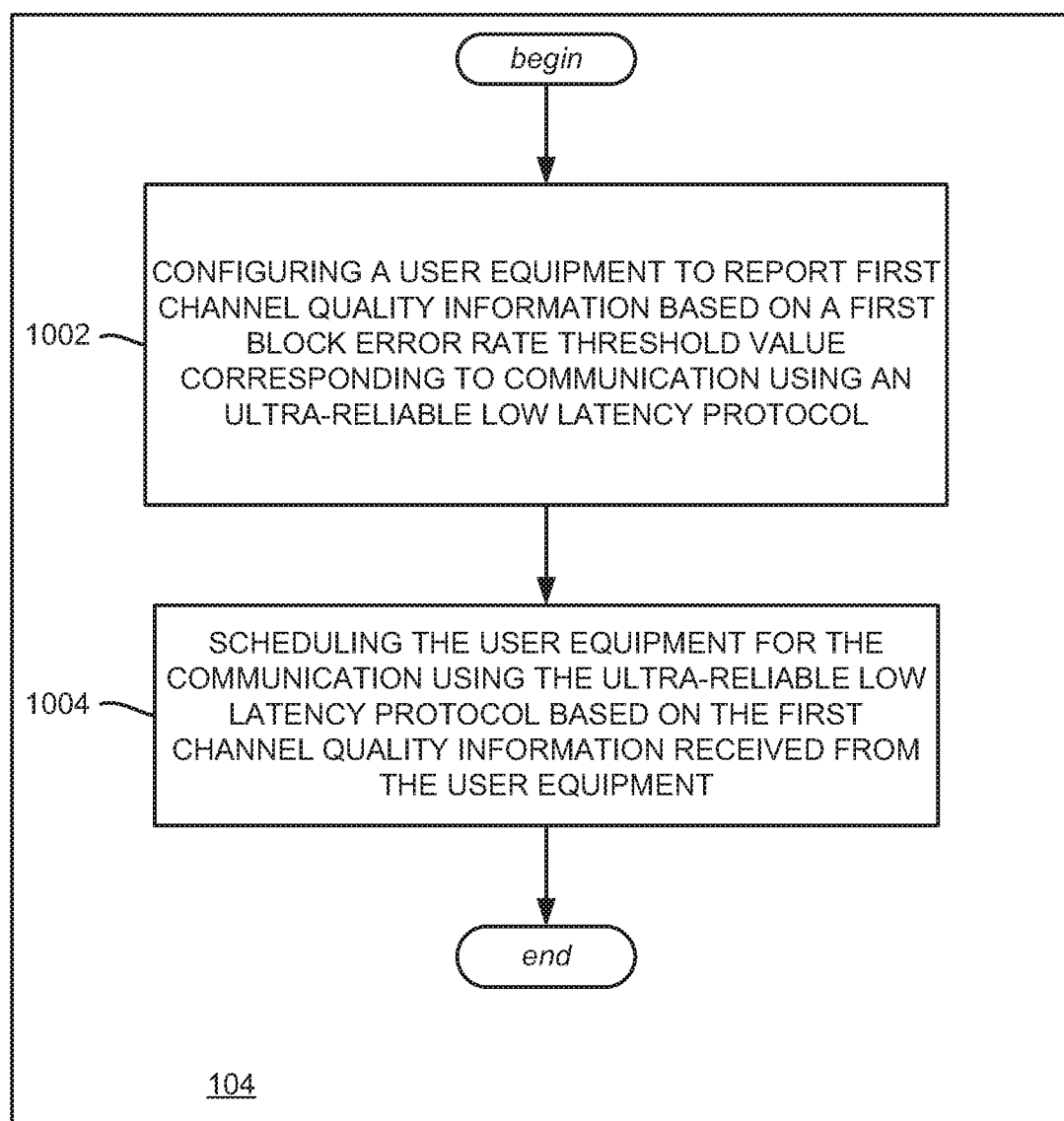
FIG. 10 illustrates an example flow diagram of aspects of operations of a network device, in accordance with various aspects and implementations of the subject disclosure.

One or more aspects are directed towards example operations represented in FIG. 10, e.g., executed via a network device 104 comprising a processor and a memory that stores executable instructions that, when executed by the processor, facilitate performance of the operations. Operation 1002 represents configuring a user equipment to report first channel quality information based on a first block error rate threshold value corresponding to communication using an ultra-reliable low latency protocol. Operation 1004 represents scheduling the user equipment for the communication using the ultra-reliable low latency protocol based on the first channel quality information received from the user equipment.

Configuring can comprise setting the user equipment to report the first channel quality information via a channel state information report setting parameter with a first value.

Further operations can comprise sending the channel state information report setting parameter with a second value to reconfigure the user equipment to report second channel quality information based on a second error rate threshold value corresponding to communication using an enhanced mobile broadband protocol.

Further operations can comprise scheduling the user equipment for the communication using the enhanced mobile broadband protocol based on the second channel quality information received from the user equipment.

Configuring the user equipment can comprise configuring the user equipment to report second channel quality information corresponding to communication using an enhanced mobile broadband protocol in a same channel state information report that contains the first channel quality information. Further operations can comprise scheduling the user equipment for the communication using the enhanced mobile broadband protocol based on the second channel quality information.

As can be seen, to provide desired reliability for ultra-reliable low latency communication applications, rather than designing a new channel state information reporting scheme, the existing two codeword channel quality indicator reporting (for enhanced mobile broadband) can be used for the ultra-reliable low latency communication mode as well, in the same report. Note that for enhanced mobile broadband, the user equipment reports two channel quality indicators corresponding to each codeword. By using the same structure for ultra-reliable low latency, the user equipment reports the enhanced mobile broadband channel quality indicator (CQI1) corresponding to the threshold of $10^{-1}$ and ultra-reliable low latency communication channel quality indicator (CQI2) corresponding to the threshold of $10^{-5}$.

In an alternative, two different reports can be sent, one for the ultra-reliable low latency communication mode, and one for the enhanced mobile broadband mode. A parameter in the channel state information settings instructs the user equipment as to which threshold to use for the channel state indicator to report.

Figure 11:
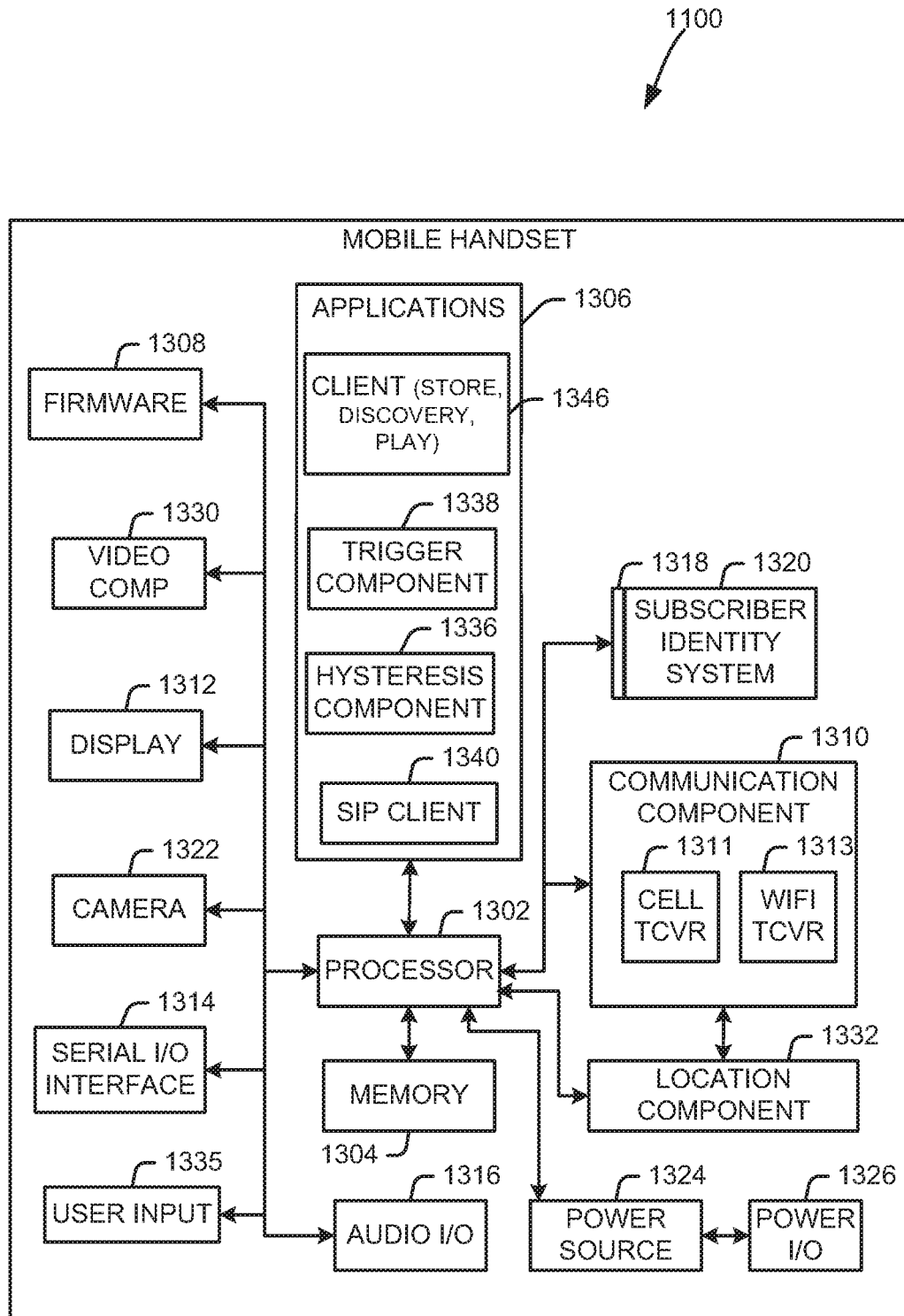
FIG. 11 illustrates an example block diagram of an example mobile handset operable to engage in a system architecture that facilitates wireless communications according to one or more embodiments described herein.

The technology described herein thus facilitates improved reliability for data channels, thereby reducing the power for transmitting the data, and a reduced number of resources for data channels as the number of retransmissions is reduced. The user experience is improved as the reliability of data transmission is improved, and the latency is reduced Referring now to FIG. 11, illustrated is an example block diagram of an example mobile handset 1100 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1194) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communications component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or a decoded format.

A video processing component 1122 (e.g., a camera) can be provided for decoding encoded multimedia content. The video processing component 1122 can aid in facilitating the generation, editing, and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1136 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 1110, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
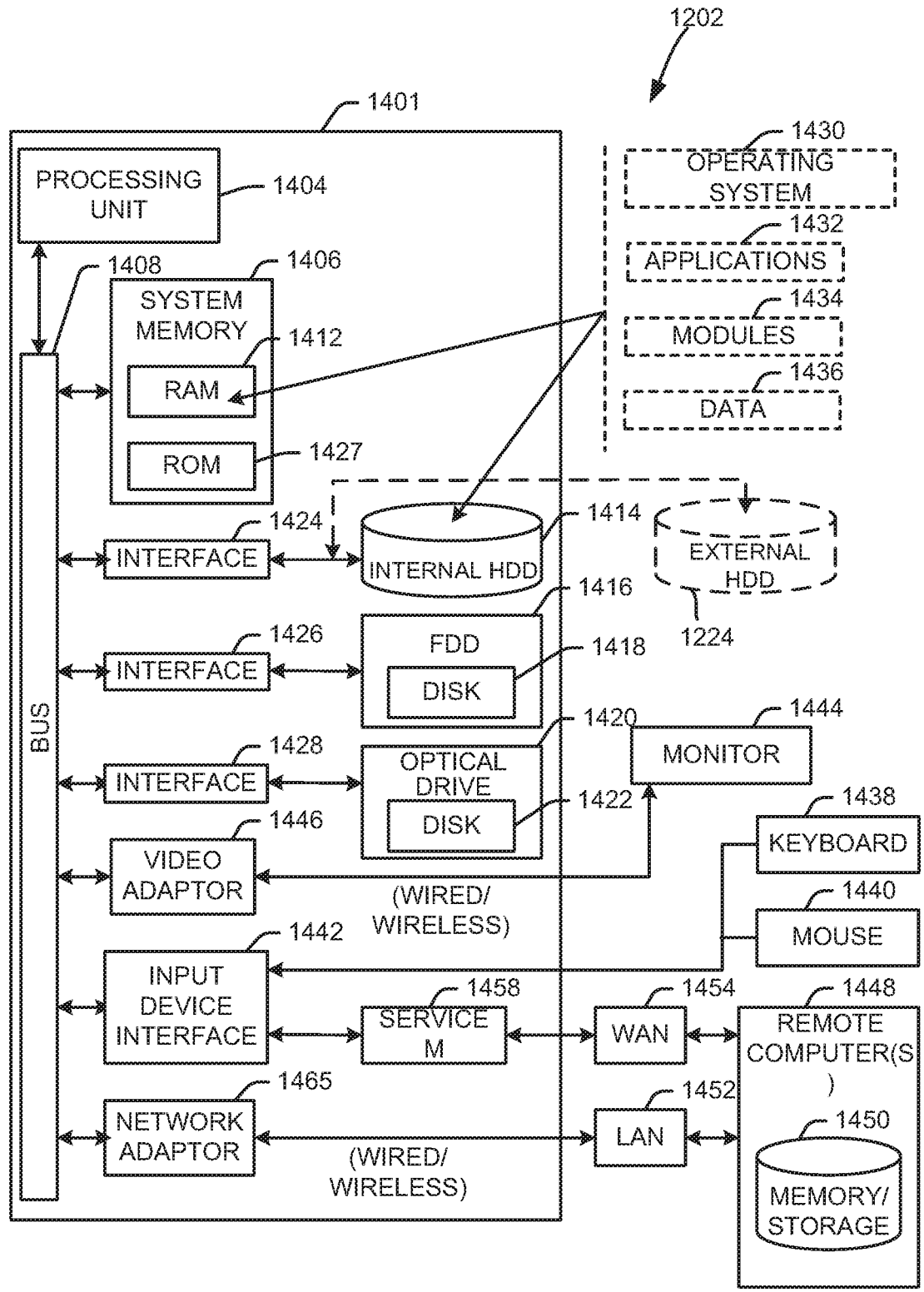
FIG. 12 illustrates an example block diagram of an example computer operable to engage in a system architecture that facilitates wireless communications according to one or more embodiments described herein.

Referring now to FIG. 12, illustrated is an example block diagram of an example computer 1200 operable to engage in a system architecture that facilitates wireless communications according to one or more embodiments described herein. The computer 1200 can provide networking and communication capabilities between a wired or wireless communication network and a server (e.g., Microsoft server) and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 12 is but one example of a computing device.

In order to provide a context for the various aspects of the disclosed subject matter, FIG. 12 and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1220 (see below), non-volatile memory 1222 (see below), disk storage 1224 (see below), and memory storage 1246 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 12 illustrates a block diagram of a computing system 1200 operable to execute the disclosed systems and methods in accordance with an embodiment. Computer 1212, which can be, for example, part of the hardware of system 1220, includes a processing unit 1214, a system memory 1216, and a system bus 1218. System bus 1218 couples system components including, but not limited to, system memory 1216 to processing unit 1214. Processing unit 1214 can be any of various available processors. Dual microprocessors and other multiprocessor architectures also can be employed as processing unit 1214.

System bus 1218 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

System memory 1216 can include volatile memory 1220 and nonvolatile memory 1222. A basic input/output system (BIOS), containing routines to transfer information between elements within computer 1212, such as during start-up, can be stored in nonvolatile memory 1222. By way of illustration, and not limitation, nonvolatile memory 1222 can include ROM, PROM, EPROM, EEPROM, or flash memory. Volatile memory 1220 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 can also include removable/non-removable, volatile/non-volatile computer storage media. FIG. 12 illustrates, for example, disk storage 1224. Disk storage 1224 includes, but is not limited to, devices like a magnetic disk drive, floppy disk drive, tape drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to system bus 1218, a removable or non-removable interface is typically used, such as interface 1226.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 12 describes software that acts as an intermediary between users and computer resources described in suitable operating environment 1200. Such software includes an operating system 1228. Operating system 1228, which can be stored on disk storage 1224, acts to control and allocate resources of computer system 1212. System applications 1230 take advantage of the management of resources by operating system 1228 through program modules 1232 and program data 1234 stored either in system memory 1216 or on disk storage 1224. It is to be noted that the disclosed subject matter can be implemented with various operating systems or combinations of operating systems.

A user can enter commands or information into computer 1212 through input device(s) 1236. As an example, a mobile device and/or portable device can include a user interface embodied in a touch sensitive display panel allowing a user to interact with computer 1212. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1214 through system bus 1218 by way of interface port(s) 1238. Interface port(s) 1238 include, for example, a serial port, a parallel port, a game port, a universal serial bus (USB), an infrared port, a Bluetooth port, an IP port, or a logical port associated with a wireless service, etc. Output device(s) 1240 and a move use some of the same type of ports as input device(s) 1236.

Thus, for example, a USB port can be used to provide input to computer 1212 and to output information from computer 1212 to an output device 1240. Output adapter 1242 is provided to illustrate that there are some output devices 1240 like monitors, speakers, and printers, among other output devices 1240, which use special adapters. Output adapters 1242 include, by way of illustration and not limitation, video and sound cards that provide means of connection between output device 1240 and system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. Remote computer(s) 1244 can be a personal computer, a server, a router, a network PC, cloud storage, cloud service, a workstation, a microprocessor based appliance, a peer device, or other common network node and the like, and typically includes many or all of the elements described relative to computer 1212.

For purposes of brevity, only a memory storage device 1246 is illustrated with remote computer(s) 1244. Remote computer(s) 1244 is logically connected to computer 1212 through a network interface 1248 and then physically connected by way of communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1250 refer(s) to hardware/software employed to connect network interface 1248 to bus 1218. While communication connection 1250 is shown for illustrative clarity inside computer 1212, it can also be external to computer 1212. The hardware/software for connection to network interface 1248 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising,
configuring, by a network device comprising a processor, a user equipment to report channel quality information in a channel state information report, wherein the channel quality information comprises first channel quality information based on a first block error rate threshold value corresponding to an ultra-reliable low latency communication and second channel quality information based on a second error rate threshold value corresponding to enhanced mobile broadband communication;
receiving, by the network device, the channel state information report from the user equipment; and scheduling, by the network device, the user equipment for the ultra-reliable low latency communication based on the first channel quality information.

2. The method of claim 1, wherein the configuring, comprises setting the user equipment to report the first channel quality information and the second channel quality information via a channel state information report setting parameter with a first value.

3. The method of claim 2, wherein the channel state information report is a first channel state information report, and further comprising reconfiguring, by the network device, the user equipment to provide a second channel state information report via the channel state information report setting parameter with a second value, wherein the second channel state information report comprises updated second channel quality information based on the second error rate threshold value corresponding to enhanced mobile broadband communication, and does not comprise updated first channel quality information, receiving, by the network device, the second channel state information report from the user equipment, and scheduling, by the network device, the user equipment for enhanced mobile broadband communication based on the updated second channel quality information.

4. The method of claim 1, wherein the first block error rate threshold value is equal to $10^{-5}$ and the second block error rate threshold value is equal to $10^{-1}$.

5. The method of claim 1, further comprising in response to determining to switch from the ultra-reliable low latency communication to the enhanced mobile broadband communication, scheduling, by the network device, the user equipment for the enhanced mobile broadband communication based on the second channel quality information without receiving an updated channel state information report from the user equipment.

6. The method of claim 1, wherein the channel state information report comprises the first channel quality information as wideband channel quality information in a part of the channel state information report and subband channel quality information in the part of the channel state information report.

7. The method of claim 1, wherein the channel state information report comprises the second channel quality information as wideband second channel quality information in a first codeword of a different part of the channel state information report and subband second channel quality information in a second codeword of the different part of the channel state information report.

8. A method, comprising,
receiving, by a user equipment comprising a processor, configuration information from a network device that instructs the user equipment to generate a channel state information report comprising first channel quality information based on a first block error rate threshold value corresponding to communication according to an ultra-reliable low latency protocol and second channel quality information based on a second error rate threshold value corresponding to enhanced mobile broadband communication;
determining, by the user equipment, the first channel quality information based on the first block error rate threshold value;
determining, by the user equipment, the second channel quality information based on the second block error rate threshold value; and
sending, by the user equipment, the channel state information report comprising the first channel state information and the second channel quality information to the network device.

9. The method of claim 8, wherein the determining the first channel quality information based on the first block error rate threshold value comprises determining the first channel quality information based on the first block error rate threshold value being equal to $10^{-5}$ or about $10^{-5}$.

10. The method of claim 8, wherein the receiving the configuration information from the network device comprises receiving a channel state information report setting parameter with a first value.

11. The method of claim 10, further comprising receiving, by the user equipment, the channel state information report setting parameter with a second value, and in response, determining, by the user equipment, updated second channel quality information based on the second block error rate threshold value, and sending, by the user equipment, an updated channel state information report comprising the updated second channel state information to the network device and not comprising updated first channel quality information.

12. The method of claim 8, wherein the determining the second channel quality information based on the second block error rate threshold value comprises determining the second channel quality information based on the second block error rate threshold value being equal to $10^{-1}$ or about $10^{-1}$.

13. The method of claim 8, wherein the reporting comprises reporting the first channel quality information as wideband channel quality information in a part of a channel state information report and subband channel quality information in the part of the channel state information report, and reporting the second channel quality information as wideband channel quality information in a codeword of a different part of the channel state information report and subband channel quality information in a different codeword of the different part of the channel state information report.

14. A network device, comprising:
a processor; and
a memory that stores executable instructions that, when executed by the processor, facilitate performance of operations, the operations comprising:
configuring a user equipment to report channel quality information in a channel state information report, wherein the channel quality information comprises first channel quality information based on a first block error rate threshold value corresponding to communication using an ultra-reliable low latency protocol and second channel quality information based on a second error rate threshold value corresponding to enhanced mobile broadband protocol; and
scheduling the user equipment for the communication using the ultra-reliable low latency protocol based on the first channel quality information in the channel state information report received from the user equipment.

15. The network device of claim 14, wherein the configuring comprises setting the user equipment to report the first channel quality information and the second channel quality information via a channel state information report setting parameter with a first value.

16. The network device of claim 15, wherein the channel state information report is a first channel state information report, and the operations further comprise sending the channel state information report setting parameter with a second value to reconfigure the user equipment to provide a second channel state information report comprising updated second channel quality information based on the second error rate threshold value corresponding to communication using the enhanced mobile broadband protocol and not comprising updated first channel quality information.

17. The network device of claim 14, wherein the operations further comprise in response to determining to switch from the ultra-reliable low latency communication to the enhanced mobile broadband communication, scheduling the user equipment for the communication using the enhanced mobile broadband protocol based on the second channel quality information without receiving an updated channel state information report from the user equipment.

18. The network device of claim 14, wherein the first block error rate threshold value is equal to $10^{-5}$ and the second block error rate threshold value is equal to $10^{-1}$.

19. The network device of claim 14, wherein the channel state information report comprises the first channel quality information as wideband channel quality information in a part of the channel state information report and subband channel quality information in the part of the channel state information report.

20. The network device of claim 19, wherein the channel state information report comprises the second channel quality information as wideband second channel quality information in a first codeword of a different part of the channel state information report and subband second channel quality information in a second codeword of the different part of the channel state information report.

* * * * *